United States Patent
Schroeder et al.

(10) Patent No.: US 9,805,580 B2
(45) Date of Patent: Oct. 31, 2017

(54) INITIATING AN ALERT BASED ON A MOBILE DEVICE BEING LEFT BEHIND

(71) Applicants: Jeffrey Mark Schroeder, Rochester Hills, MI (US); Dinu Petre Madau, Canton, MI (US); Gary Edward Zack, Novi, MI (US)

(72) Inventors: Jeffrey Mark Schroeder, Rochester Hills, MI (US); Dinu Petre Madau, Canton, MI (US); Gary Edward Zack, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 125 days.

(21) Appl. No.: 14/604,172

(22) Filed: Jan. 23, 2015

(65) Prior Publication Data

US 2016/0217675 A1    Jul. 28, 2016

(51) Int. Cl.
*G08B 21/24* (2006.01)
*B60L 1/00* (2006.01)
*H02J 50/90* (2016.01)

(52) U.S. Cl.
CPC .............. *G08B 21/24* (2013.01); *B60L 1/00* (2013.01); *H02J 50/90* (2016.02)

(58) Field of Classification Search
CPC .... H04N 21/4223; A45C 13/18; G01V 15/00; H04M 1/6075; H04M 1/7253; H04M 2250/02; H04M 2250/04; H04W 4/008; H04W 4/023; H04W 4/046
See application file for complete search history.

(56) References Cited

U.S. PATENT DOCUMENTS

| | | | | |
|---|---|---|---|---|
| 8,284,041 B2* | 10/2012 | Cuddihy | ................ | B60N 2/002 340/457 |
| 8,629,767 B2* | 1/2014 | Stefanovski | ............ | B60R 25/24 340/425.5 |
| 8,947,222 B2* | 2/2015 | DeLuca | ................. | A45C 13/18 340/457 |
| 2002/0074786 A1* | 6/2002 | Hamperl | ........... | B60R 21/01534 280/735 |
| 2003/0025793 A1* | 2/2003 | McMahon | ............. | H04N 7/181 348/148 |
| 2004/0267883 A1* | 12/2004 | Chipchase | ............. | F16M 13/00 709/206 |
| 2007/0129113 A1* | 6/2007 | Klicpera | ............. | H04M 1/7253 455/567 |
| 2013/0012123 A1* | 1/2013 | DeLuca | ................. | A45C 13/18 455/39 |

(Continued)

FOREIGN PATENT DOCUMENTS

JP    2502590 A    * 12/2013    .............. G08B 21/24

*Primary Examiner* — Fekadeselassie Girma
(74) *Attorney, Agent, or Firm* — Dickinson Wright PLLC (57) ABSTRACT

A system and method for indicating an alert associated with a mobile device are provided. The system includes a device detector to detect whether the mobile device is in a state of wireless charging; an exit signal receiver to detect an event associated with an exit; a device determiner to determine, after the event is detected, whether the mobile device is in an area associated with the wireless charging; and a vehicle notifier to transmit an alert based the determination by the device determiner. Also provided is a method for augmenting a wireless charging system with a notification system.

10 Claims, 6 Drawing Sheets

(56) References Cited

U.S. PATENT DOCUMENTS

| | | | | |
|---|---|---|---|---|
| 2013/0106684 A1* | 5/2013 | Weast | ............... | G06F 19/3481 |
| | | | | 345/156 |
| 2013/0110318 A1* | 5/2013 | Colja | ............... | H02J 7/042 |
| | | | | 701/2 |
| 2013/0154819 A1* | 6/2013 | Stefanovski | ............... | B60R 25/24 |
| | | | | 340/457 |
| 2014/0011482 A1 | 1/2014 | Le et al. | | |
| 2014/0070929 A1* | 3/2014 | Myers | ............... | B60R 25/10 |
| | | | | 340/426.18 |
| 2014/0167438 A1* | 6/2014 | Lambert | ............... | B60R 16/02 |
| | | | | 296/24.34 |
| 2014/0347009 A1* | 11/2014 | Hongo | ............... | H02J 17/00 |
| | | | | 320/108 |
| 2015/0054660 A1* | 2/2015 | Simmons | ............... | B60Q 1/46 |
| | | | | 340/908 |
| 2015/0244201 A1* | 8/2015 | Chu | ............... | H02J 7/025 |
| | | | | 320/108 |
| 2015/0288216 A1* | 10/2015 | Wu | ............... | H02J 7/025 |
| | | | | 320/101 |
| 2015/0303995 A1* | 10/2015 | Staring | ............... | H02J 5/005 |
| | | | | 307/104 |
| 2016/0013678 A1* | 1/2016 | Bell | ............... | H02J 50/80 |
| | | | | 320/108 |
| 2016/0118835 A1* | 4/2016 | Desai | ............... | H02J 7/025 |
| | | | | 320/108 |
| 2016/0249191 A1* | 8/2016 | Avrahami | ............... | H04L 67/12 |

\* cited by examiner

INITIATING AN ALERT BASED ON A MOBILE DEVICE BEING LEFT BEHIND

BACKGROUND

Electronic devices are increasingly becoming more mobile in nature. A person may carry the device while traveling or in general transit. A common example of a mobile and portable electronic device is a mobile phone. However, various devices may be carried and employed in a mobile fashion, such as, a laptop, a tablet, a smart phone, a speaker, or the like.

In designing electronic devices, one key component is the delivery and transfer of power to the electronic device. As devices become smaller, so do the batteries or energy sources. In the realm of smart phones, the phones may become smaller, but the processing technology becomes more complex and in some cases, more capable of drawing energy. Accordingly, a need arises to charge or power an electronic device while a person is in transit.

However, there may be limits as to locations where a device can be charged. A common location that is relied upon is a vehicle. The vehicle already supplies power to the various electronic componentry associated with the operation of the vehicle. For example, the vehicle may supply a display, an audio system, a lighting system, or the like. Thus, providing an outlet to charge a mobile device (or multiple mobile devices) may be easily accomplished in a vehicular context.

One such technique is wireless charging. Wireless charging devices provide charging through inductive coupling a power source with the mobile device to be charged. Wireless charging allows a mobile device to be charged without the employment of a wire between the wireless charging system and the mobile device.

SUMMARY

A system and method for indicating an alert associated with a mobile device are provided. The system includes a device detector to detect whether the mobile device is in a state of wireless charging; an exit signal receiver to detect an event associated with an exit; a device determiner to determine, after the event is detected, whether the mobile device is in an area associated with the wireless charging; and a vehicle notifier to transmit an alert based the determination by the device determiner. Also provided is a method for augmenting a wireless charging system with a notification system.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Wireless charging systems are being implemented in various locations to facilitate and provide charging for mobile devices. A mobile device is placed on a surface, area, or compartment dedicated to wirelessly charge the mobile device.

As stated in the Background section, owners and operators of mobile devices often leave the mobile device behind. Specific vehicles even contain charging areas that obscure the mobile device from view. In these situations, an owner or operator of a mobile device is likely to leave the mobile device in the vehicle.

Leaving the device behind may frustrate the enjoyment of the mobile device, and in some cases, potentially damage the device. Certain mobile devices are affected by weather, and thus, leaving the device in a hot or cold environment might ultimately lead the device not operating properly.

Disclosed herein are methods, systems, and devices for indicating an alert in response to a mobile device being left behind. In particular, the term left behind may be denoted as a surface, area, or compartment earmarked to facilitate in wireless charging. By employing the aspects disclosed herein, a mobile device wireless charging system may override a more convenient experience, while promoting the lifetime and integrity of the mobile device.

Figure 1:
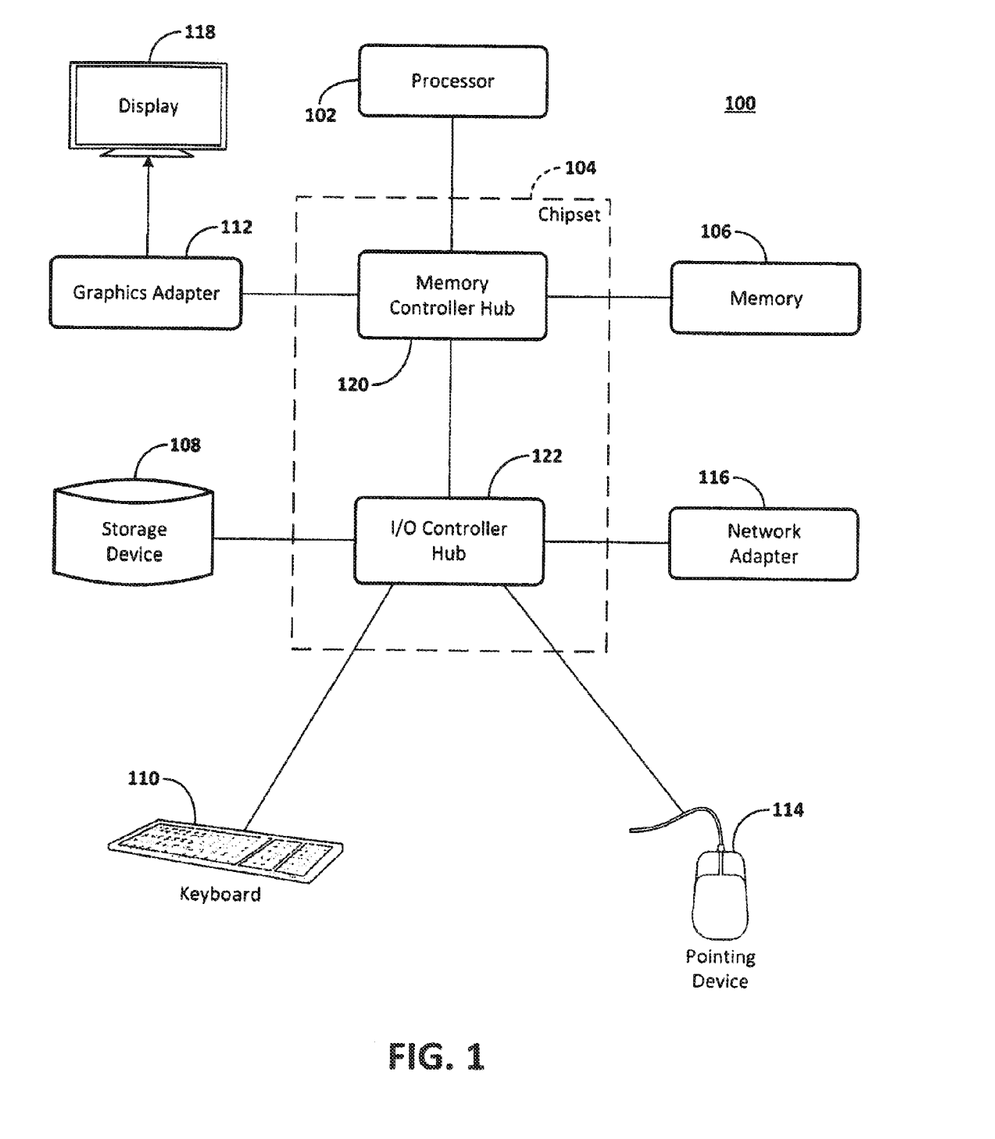
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user.

The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
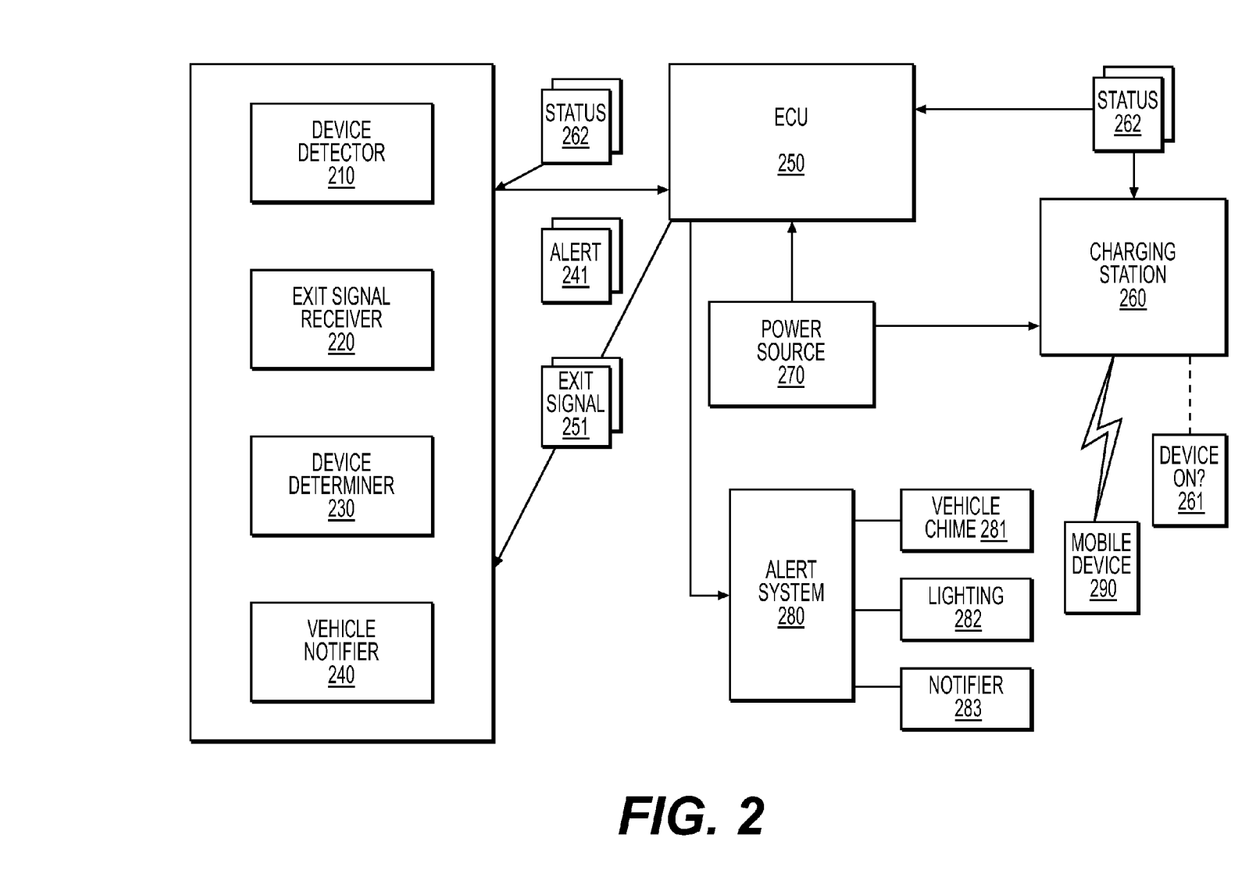
FIG. 2 illustrates an example of a system for indicating an alert in response to a mobile device being left behind.

FIG. 2 illustrates a system 200 for indicating an alert 241 in response to a mobile device 290 being left behind. As explained above, a mobile device may be left behind in various contexts and situations. In one context, the mobile device 290 may be placed in a location employed for charging. As explained above, if system 200 is installed or integrated into a vehicle, the mobile device 290 may be left behind in an area associated with charging or storage (i.e. a hidden compartment, a charging pad, a glove compartment, or the like).

The vehicle of FIG. 2 may contain an electronic control unit (ECU) 250. A ECU 250 is known in the art, and thus, a detailed explanation will be omitted. The ECU 250 may allow the various components shown in FIG. 2 to communicate with one another over an electronic bus (a wired or wireless connection). The ECU 250 may be configured to communicate output signals to various components associated with the vehicle.

For example, the vehicle includes an alert system 280. The alert system 280 may refer to any system associated with a vehicle that is capable of alerting a driver/passenger associated with the vehicle. The alert system 280 may receive an electrical signal (such as alert 241), and generate one of the shown alerts in FIG. 2, such as a vehicle chime 281, a lighting system 282, or a notifier 283. The alert employed may be chosen by the implementer of system 200, or of the vehicle itself. Multiple alerts may also be employed, and a driver/passenger may enable or disable the receiving of alerts based on a preference.

The ECU 250 may also be connected to a power source 270 (in the context of a vehicle, an electrical delivery system). In certain cases, the power may be generated from a vehicle's battery. In other cases, the vehicle may generate power via a gasoline delivery system. The power delivery via the power source may vary depending on the current state or operation of the vehicle.

Also shown in FIG. 2 is a charging station 260. The charging station 260 is configured to detect a mobile device 290 placed on a charging station 260 (for example on a pad that is configured to provide an area for wireless charging).

The charging station 260 may be equipped with a circuit to detect whether a charging station 260 is in a state of wireless charging a mobile device 290 (device on? 261). Thus, when a mobile device 290 is placed onto a pad associated with wireless charging (or charging station 260), a detection that a mobile device 290 is placed onto the system is made. Conversely, when the mobile device 290 is removed from a pad (or charging station 260), the indication of a mobile device 290 being in a state of charging may be removed. This indication (status 262) may be transmitted to the ECU 250, and subsequently transmitted to system 200. The status 262 may be transmitted at predetermined intervals, or at the time when a mobile device 290 is placed onto or around the charging station 260 (or when removed).

The device detector 210 receives the status 262. The device detector 210 may store the status 262 (and the data associated with status 262) in a temporary storage device, such as a memory register.

The exit signal receiver 220 receives a signal from the ECU 250 (signal 251) that a person associated with the vehicle has exited the car, or is exiting the car. Signal 251 may be generated by several different events. In one case, the exit signal 251 may be generated by detecting an opening and a closing of the vehicle. In another situation, the exit signal 251 may be generated by detecting that a vehicle has been turned off. In another situation, the exit signal 251 may be generated by detecting that a fob (i.e. a key fob), is no longer within a communicable distance to the vehicle, or beyond a predetermined threshold distance. One or more of these detection mechanisms can be used in combination to determine a valid exit.

In response to an exit signal 251 being generated and received by system 200, the device determiner 230 may determine whether the mobile device 290 is still on or affixed to the charging station 260. The system 200 may receive the status signal 262, and accordingly, if the exit signal 251 is received and the status 262 indicates that a mobile device 290 is still on or around the wireless charging station 260, the vehicle notifier 240 may be instigated.

In one implementation, the device determiner 230 may perform this determination after a predetermined time period has elapsed.

The vehicle notifier 240 is configured to transmit an alert 241 to the ECU 250 (or directly to an alert system 280). The alert 241 may be an electronic impulse that is configured to be received as an input to either the ECU 250 or alert system 280. In another example, the alert 241 may be embedded in a digital communication transmitted to one of the receiving componentry.

Once the ECU 250 and the alert system 280 receive the alert 241, an alerting action may be instigated. In one example, the ECU 250 controls the alert system 280 to initiate an alert action. In another example, the alert system 280 may be directly driven.

The alert system 280 may be coupled to an alert generating device. Several types and combinations of alert generating devices may be employed. Referring to FIG. 2, several examples are shown, such as a vehicle chime 281, a lighting system 282, and a notifier 283. The notifier 283 may be wirelessly coupled to an external device, such as key fob, and transmit an indication to the key fob in connection with a detection that a mobile device 290 is left behind.

Once the alert generating device, such as those enumerated above, receives the alert 241, an alerting action may be taken. For example, a loud sound may be emitted, or a light may flash. The implementer of system 200 may configure the alerting action to time out after a predetermined amount of time.

Figure 3:
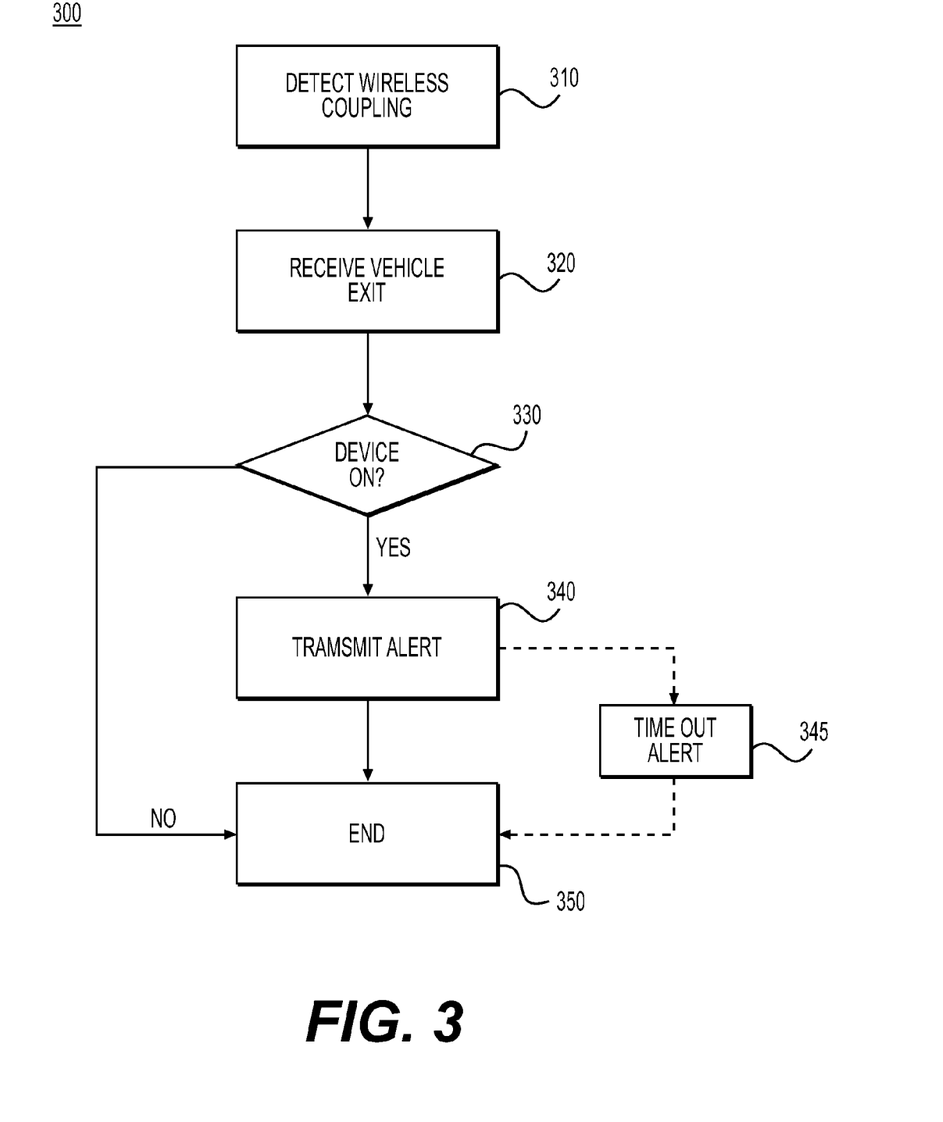
FIG. 3 illustrates an example of a method for indicating an alert in response to a mobile device being left behind.

FIG. 3 illustrates an example of a method 300 for initiating an alert based on a mobile device being left behind. The method 300 may be implemented on a device, such as computer 100. The method 300 may be implemented in a vehicle or any sort of context in which wireless charging of an electronic device occurs.

In operation 310, a detection of wireless coupling is made. The detection may be made when a mobile device is placed on an area earmarked for wireless charging. Thus, a wireless charging source may store a record that a mobile device is in the process of wireless charging due to a stimulus, such as a detection of current being inductively provided to a mobile device.

In operation 320, a vehicle exit signal may be received. This may be received through various techniques, such as, detecting if a vehicle has stopped operating (i.e. an engine or ignition being disengaged), a signal from a door opening, a camera or monitoring device, or the like. The vehicle exit signal may be stored in a temporary memory, such as a register.

In operation 330, a determination of whether the device associated with the wireless coupling in operation 310, is still on or around the wireless charging area. This determination may be performed in accordance with any of the techniques discussed above.

If the determination is no, the method 300 proceeds to end 350. If the determination is yes, the method 300 proceeds to operation 340. In operation 340, transmitting of an alert may occur. The alert transmission may occur in accordance with any of the enumerated techniques above, or other alerting techniques known.

In an alternate example, method 300 may proceed to a time out operation 345. In the time out operation 345, a predetermined time period may be set. Once the predetermined time period elapses, the method 300 may disengage the alert, and proceed to method 300.

FIGS. 4(a)-(d) illustrate an example implementation of the system 200 implemented in a vehicle 400. The system 200 may be integrated into a wireless charging system 260, or provided as an add-on feature to a pre-existing vehicle.

Figure 4A:
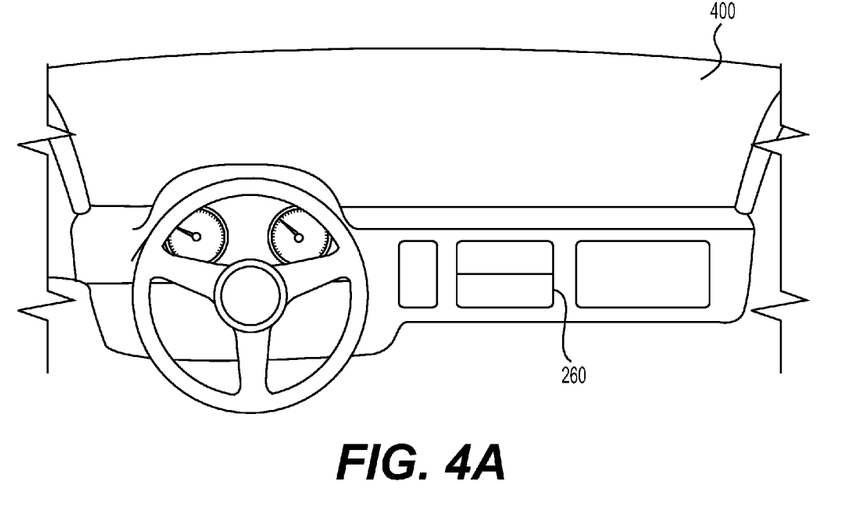
FIGS. 4(a)-(d) illustrate an example implementation of the system in FIG. 2 being implemented in a vehicle.

In FIG. 4(a), the vehicle 400 is shown with a wireless charging station 260. In the current state shown in FIG. 4(a), the vehicle 400 is unoccupied, and the wireless charging area 260 is presently not charging any mobile device.

Figure 4B:
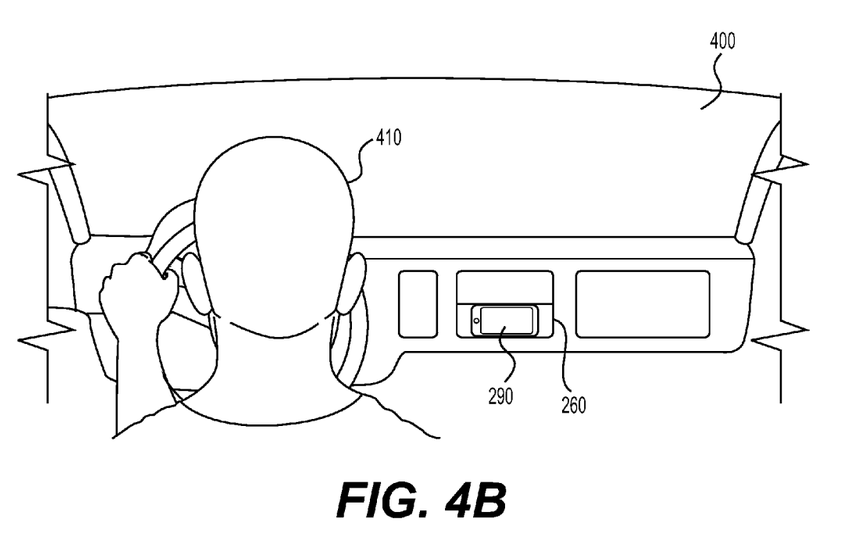

In FIG. 4(b), the same vehicle 400 is shown. However, a driver 410 now occupies and operates the vehicle 400. Also shown is a mobile device 290 placed in the wireless charging station 260.

Figure 4C:
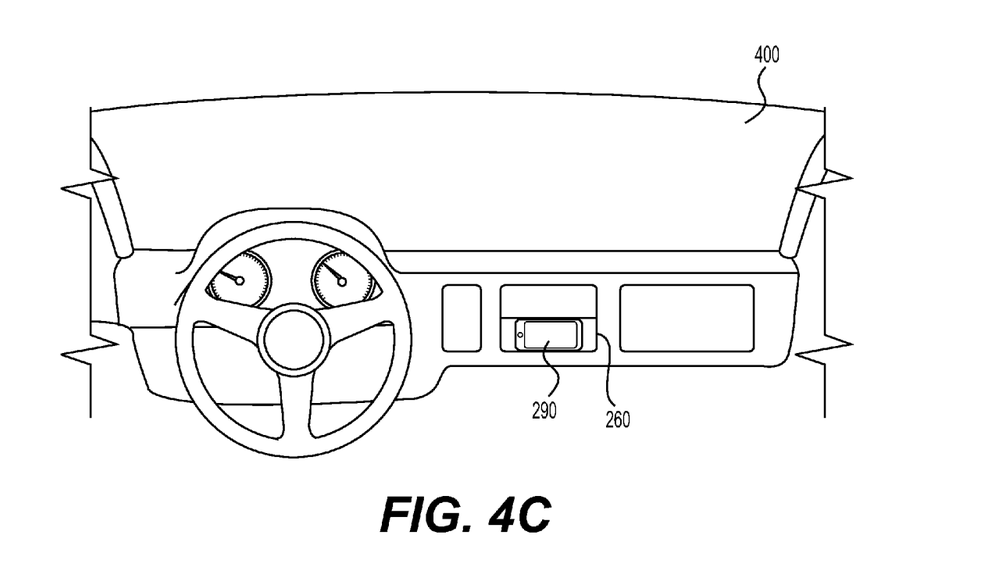
Figure 4D:
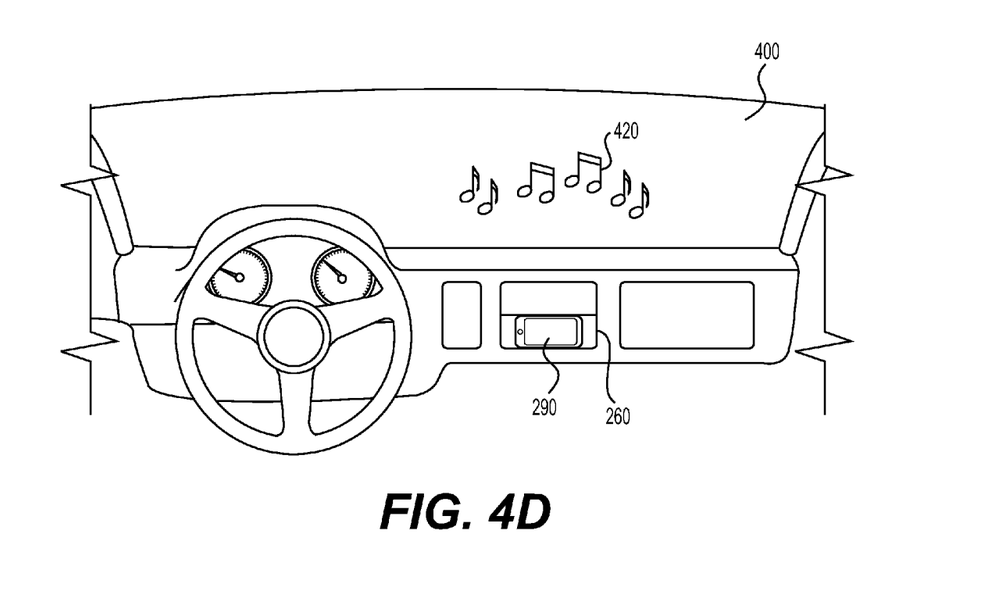

In FIG. 4(c), the driver 410 has now left the vehicle 400. As shown, the driver 410 has also left the mobile device 290 in the wireless charging area 260. In FIG. 4(d), employing the aspects described above with regards to system 200, an alert 420 is generated. The alert 420 may be a sound generated by the vehicle 400 (audible inside or outside of the vehicle 400). The alert 420 may be any of the alerts mentioned above.

Figure 5:
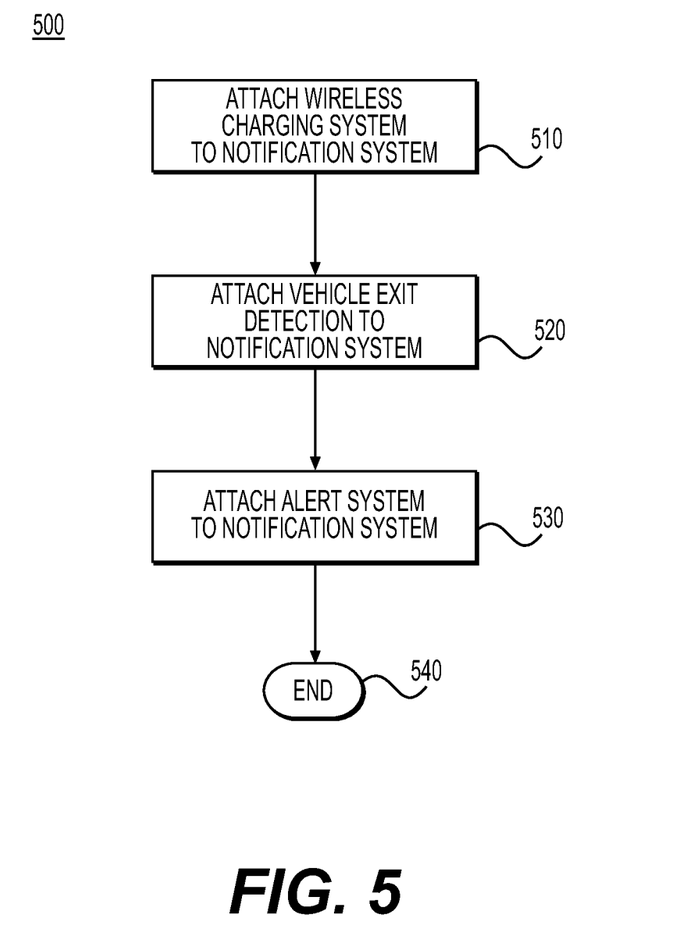
FIG. 5 illustrates an example of a method for augmenting a wireless charging system with a notification system.

FIG. 5 illustrates a method 500 for augmenting a wireless charging system with a notification system. The order of the operations shown below is merely exemplary. Other permutations of the ordering may accomplish an augmented wireless charging area.

In operation 510, a wireless charging system/area is attached to a notification system. The wireless charging system may be hardwired, wirelessly coupled, or attached to a common processor (for example a ECU or microcontroller) coupled to the notification system.

In operation 520, a vehicle exit detection system is coupled to the notification system in the same says as described in option 510. In operation 530, an alert system is coupled to the notification system. Accordingly, a technique for alerting a party (for example, the owner of a mobile device left behind the wireless charging system), may be provided along with the notification system.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for indicating an alert associated with a mobile device, comprising:
    a device detector to detect whether the mobile device is in a state of wireless charging or in an area for wireless charging;
    an exit signal receiver to detect an event associated with an exit;
    a device determiner to determine, after the event is detected, whether the mobile device is in an area associated with the wireless charging; and
    a vehicle notifier to transmit an alert based the determination by the device determiner,
    the device detector further being configured to store an indication that the mobile device has commenced wireless charging, the indication only being resettable when the mobile device is physically removed from the area associated with wireless charging, and
    the device determiner is further configured to make the determination by monitoring the indication, and in response to the indication not being reset, determining that the mobile device is in the area associated with the wireless charging.

2. The system according to claim 1, wherein the event is the disengagement of a vehicle operation.

3. The system according to claim 1, wherein the event is generated in response to a vehicle door opening.

4. The system according to claim 1, wherein the event is generated in response to a video capturing device detecting the exit of a person.

5. The system according to claim 1, wherein the alert is a sound generated from the vehicle or the mobile device.

6. The system according to claim 1, wherein the alert is a light generated from the vehicle.

7. The system according to claim 1, wherein the alert is communicated wirelessly or wired to a secondary device.

8. The system according to claim 7, wherein the secondary device is a key fob.

9. The system according to claim 1, wherein the indication is triggered by the mobile device receiving wireless charging from the wireless charging device.

10. The system according to claim 1, wherein the indication is triggered by a weight sensor incorporated with the wireless charging area.

\* \* \* \* \*